(No Model.)
F. S. SEAGRAVE.
VEHICLE RUNNING GEAR.
No. 357,417.          Patented Feb. 8, 1887.
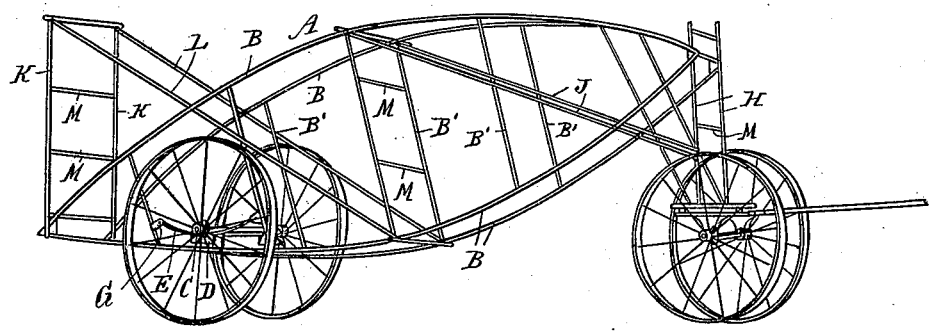
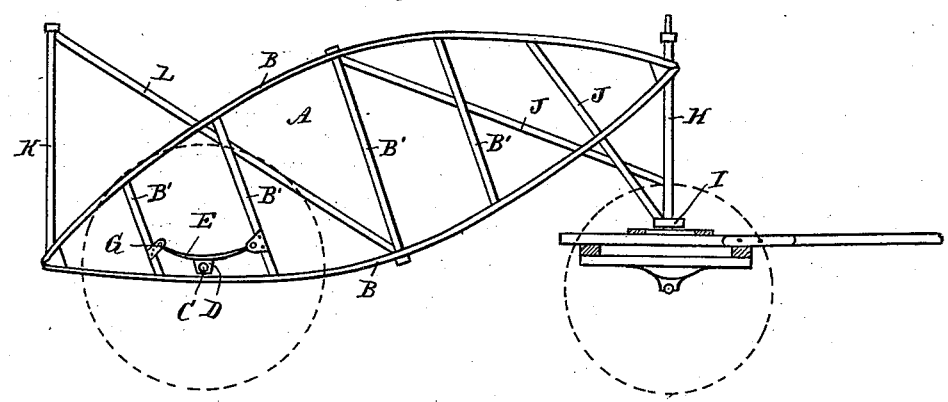
Attest:
John Schuman.
Charles J. Hunt.
Inventor:
Frederic S. Seagrave.
by his Att'y
Thos. S. Sprague

UNITED STATES PATENT OFFICE.

FREDERIC S. SEAGRAVE, OF SOUTH BAY CITY, MICHIGAN.

VEHICLE RUNNING-GEAR.

SPECIFICATION forming part of Letters Patent No. 357,417, dated February 8, 1887.

Application filed September 23, 1886. Serial No. 214,342. (No model.)

*To all whom it may concern:*

Be it known that I, FREDERIC S. SEAGRAVE, of South Bay City, in the county of Bay and State of Michigan, have invented new and useful Improvements in Trucks; and I do hereby declare that the following is a full, clear, and exact description thereof, reference being had to the accompanying drawings, which form a part of this specification.

This invention relates to certain new and useful improvements in trucks, such as ladder, hose, or like trucks.

The object of this invention is to construct a light but strong truck wherein the load is carried low down, and yet so as to allow the front wheels to turn under the forward end to facilitate turning round.

To this end the invention consists in the peculiar construction and arrangement of trussed side frames, the rear ends of which are hung near or below the rear axle, while their front ends are raised upon standards considerably above the front axle, all as more fully hereinafter set forth.

Figure 1 is a perspective view of my improved truck. Fig. 2 is a side elevation of the same with the wheels removed, but shown in dotted outline.

In the accompanying drawings, which form a part of this specification, A represents two elliptical trusses, forming the sides of the truck-frame, and consisting of the bent chords B, secured together at their ends, and the struts B'. These trusses are connected together by proper cross-girts.

The rear end of the frame so constructed is supported and hung upon the rear axle as follows: C is the rear axle, upon which are secured the blocks D, which carry the springs E. One end of each spring is pivotally secured, in any suitable manner, to one of the struts B', while the opposite ends are hung in any suitable shackle, G, pivotally secured to the rear strut, as shown, thereby providing for a lengthening of the springs under the imposed load. The front ends of the side frames are supported in an elevated position by means of standards H, rising from a bolster, I, the latter of which is suitably mounted upon any proper platform-gear. The frames A are further secured to the frame H by the diagonal struts or braces J. In this construction it will readily be seen that the wheels of the forward truck are free to pass unobstructedly under the frame, thereby enabling the truck to be turned around within its own length. By this construction I provide a frame for a truck that is light but very strong, and one that may be employed for various uses.

To adapt the device for use as a ladder-truck, I erect at the rear end a vertical frame, K, which I brace to the frame A by the diagonal braces L, and at suitable points I introduce cross-rollers, as at M, to facilitate the easy handling of the ladders in loading and unloading.

What I claim as my invention is—

1. A truck-frame consisting of trussed elliptical side frames, A, mounted in an incline upon suitable supports, substantially as described.

2. A truck-frame consisting of trussed side frames, A, in combination with the forward standards, H, and springs E, substantially as and for the purposes set forth.

3. A truck-frame consisting of trussed frames A, in combination with the standards H, springs E, diagonal brace J, and bolster I, substantially as described.

4. In a truck, the combination of the trussed side frames, A, standards H, braces J, frame K, braces L, and springs E, when constructed, arranged, and operated substantially as and for the purposes set forth.

FREDERIC S. SEAGRAVE.

Witnesses:
ISAAC A. GILBERT,
FRANK S. PRATT.